March 8, 1927. 1,620,362
M. LACHMAN ET AL
GIRDER
Filed June 27, 1924
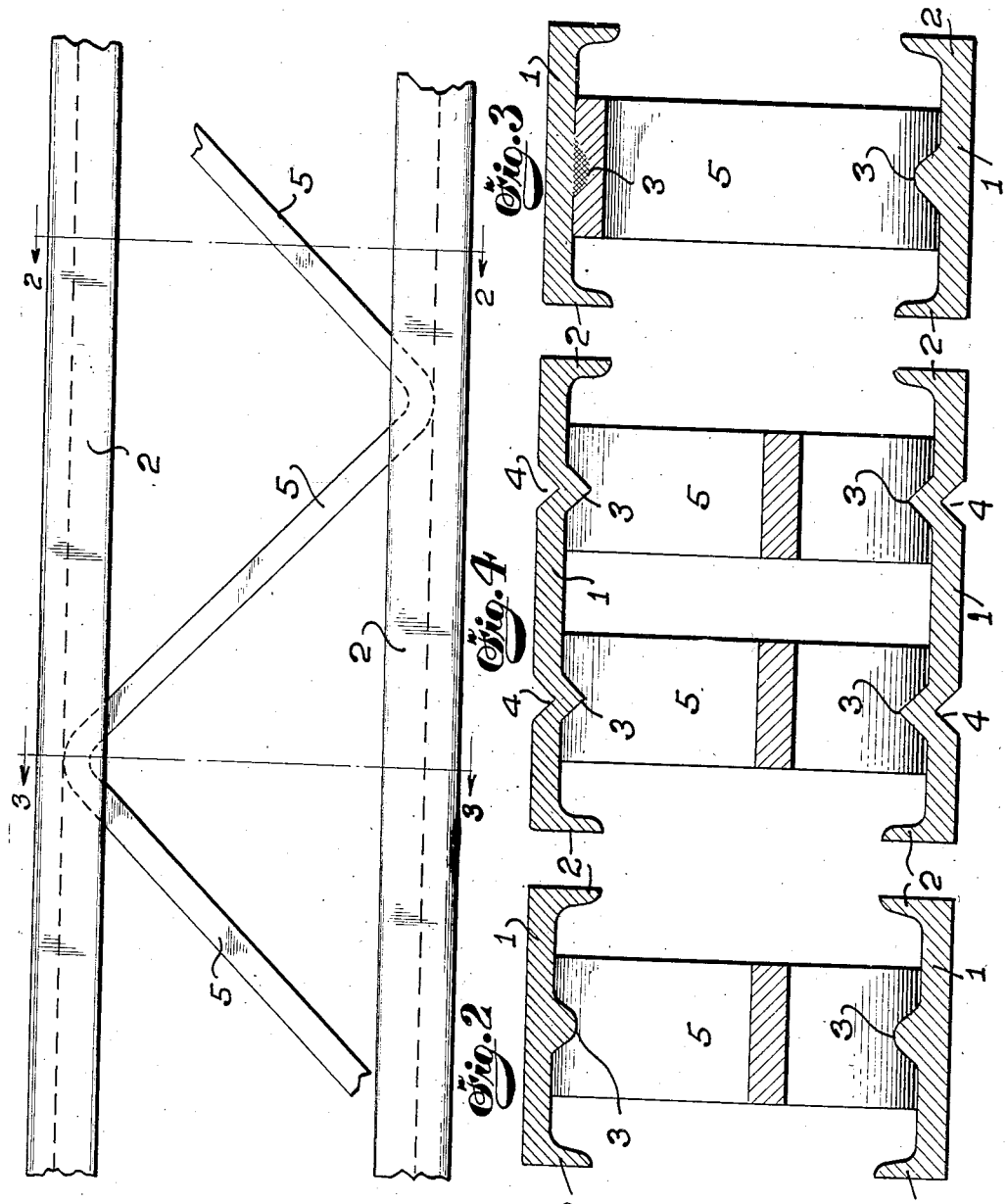
INVENTORS
Maurice Lachman
Lawrence J. Lachman
BY Townsend & Decker
ATTORNEYS.

Patented Mar. 8, 1927.

1,620,362

UNITED STATES PATENT OFFICE.

MAURICE LACHMAN AND LAURENCE S. LACHMAN, OF NEW YORK, N. Y., ASSIGNORS TO UNIVERSAL ELECTRIC WELDING COMPANY, A CORPORATION OF NEW YORK.

GIRDER.

Application filed June 27, 1924. Serial No. 722,635.

Our invention relates to composite constructions of metal and is particularly useful as or in the construction of girders, frames, columns, concrete reinforcements or for other uses.

The object of our invention is to provide a composite construction having its elements electrically welded together and of maximum strength and minimum weight and adapted to provide effective resistance to bending, torsional, twisting or other strains or loads, by employment of the improved form of channel iron section described in our companion application filed of even date herewith as one of the elements or members of the composite construction.

The invention consists substantially in an improved construction and manner of assembly and uniting the channel iron section of our companion application with a plate member forming for instance a tying member or diagonal of a girder, column or similar structure as hereinafter more particularly described.

As our invention is particularly useful for a skeleton girder, it will be shown and described as embodied in a girder.

In the accompanying drawings:

Fig. 1 is a side elevation of a girder embodying the invention.

Fig. 2 is a cross-section of Fig. 1 on the line 2—2.

Fig. 3 is a cross-section on the line 3—3 of Fig. 1 through one of the welds.

Fig. 4 is a fragmentary section of a modification.

In the accompanying drawings 1 indicates the web of a channel iron section such as described in our companion application filed of even date herewith. 2 indicates the strengthening side flanges of the channel and 3 indicates the welding and reinforcing longitudinal ribs or ridges disposed on the inside of the web and between the flanges and projecting inwardly from said surface, the line of projection being preferably substantially parallel with the line of projection of the flanges. Said ribs or ridges are formed in the rolling of the complete channel iron section and are relatively low in the extent of their projection from the surface of the web. Each is preferably reduced, narrowed or rounded at its free edge to afford a reduced area of initial electrical contact for a welding operation.

In practice one or more of said ribs or ridges in proximity with one another may be employed and if desired the opposite face of the web of the channel may be left smooth although it may be found desirable in practice, particularly in the case of heavy cross sections, to roll a groove indicated at 4 in Fig. 4 in the opposite face of the web to compensate for the metal used to form the ridge or rib as described in said companion application. The rib or ridge also is of height or depth of projection above the surface of the web and the mass of said rib or ridge is such that when the operation of welding is completed the surface of the member welded to the channel may seat against the surface of the web.

5 indicates a plate, strip, or flat web of metal welded to the inner surface of the web of the channel by means of said welding ribs or ridges. As thus secured to the channel between the side flanges it will be partially housed by said flanges. In the present instance wherein the invention is embodied in a girder said plate or strip constitute the strut or diagonal member or members of a skeleton girder or frame and preferably it consists of a rolled plate or strip bent into zig-zag form and of greater or less width as may be desired under the actual conditions of intended use of the girder or frame. At the bends or rounded contour of the plate or zig-zag it is welded by a cross-weld to the inner surface of the channel irons constituting the upper and lower members of the girder by a cross-weld at the crossing of the rib or ridge with the surface of the bend. By reason of the limited amount of material contained in the strengthening and welding ribs or ridges as compared with the side flanges of the channel iron, the flat of the web is permitted under the welding pressure to become engaged with the flat inner surface of the web, thus effectually preventing sidewise rocking of the one member upon the other and securing the greatest possible stiffness of the structure with a limited amount of material employed.

In the form of our invention shown in Figs. 1 and 2 a single zig-zag tying or diagonal member is shown welded by ribs or ridges, two in number, projecting from the web between the said flanges, but as indicated in Fig. 4, a number of similar zig-zags may be employed each welded in the same manner, the one or more welding ribs or ridges for each tying member in this instance being disposed near the side flanges 1 between the same and the center, whereas in the case of Fig. 1 one or more ribs or ridges are disposed at or near the central line of the web portion of the channel iron.

In our improved construction the resistance to torsion, side bending, or twisting forces or to load imposed upon the upper or lower channel members tending to deform them will be effectually resisted owing to the fact that in the structure advantage is taken not only of the superior stiffening effect secured by the location of the flanges at the edges of the webbed part but as well of the superimposed stiffening effect introduced by the welding ribs or ridges between the side flanges, and also of the large surface of engagement of the superimposed plate members consisting of the web and strip or plate 2 at their place of welding and engagement by their plane faces. Also, as will be seen, the stiffening effect in the case of a girder or similar structure is heightened by reason of the form and disposition of the interposed zig-zag member which is a plate or strip the plane of which is substantially parallel to the plane of the web in the two channel members and is disposed in a plane transverse to the general plane of the grider so that the whole will effectually resist side stresses applied in the girder or similar structure wherein the parts are combined as herein described and will also effectually resist any tendency to torsion under load.

What we claim as our invention is—

1. In a metallic structural element, the combination of outside members having inner opposed flat surfaces with longitudinal ribs protruding therefrom and toward each other and a middle member disposed between planes of the side edges of the outside members and having angular portions disposed transversely of the ribs and welded thereto at the angles so that said angular portions rest flush against said surfaces.

2. In a metallic structural element, the combination of a pair of outside, rolled channel members having the flanges thereof extending toward each other and having inner opposed flat surfaces with longitudinal ribs protruding therefrom and toward each other and a middle zig-zag member having its major transverse dimension parallel to said surfaces and having the angular portions thereof disposed between said flanges and transversely of the ribs and welded at the bends to the latter so that said angular portions rest flush against said surfaces.

3. As an element of a beam structure, a longitudinal member having a flat face and a longitudinal rib extending the length thereof, said rib when electrically heated being adapted to enter into and become welded to the bends of a zig-zag middle member, the surface of which will then lie flat against the face of the longitudinal member.

4. A girder comprising two longitudinal members, the opposing faces of each having a longitudinal rib, a zig-zag middle member electrically welded at each bend to a rib, the portion of the longitudinal members on each side of the welded joints acting to support those portions of the middle member on each side of such joints.

Signed at New York in the county of New York and State of New York this 23rd day of June, A. D. 1924.

LAURENCE S. LACHMAN.
MAURICE LACHMAN.